United States Patent [19]

Reed et al.

[11] Patent Number: 4,980,924

[45] Date of Patent: Dec. 25, 1990

[54] HF RADIO COMMUNICATION SYSTEMS WITH FREQUENCY MANAGEMENT

[75] Inventors: Allyson P. C. Reed, Oxfordshire; Robert J. Goodwin, Hants; Ernest T. Clarke, Hants; David J. S. Williams, Hants, all of United Kingdom

[73] Assignee: Plessey Overseas Limited, Ilford, England

[21] Appl. No.: 220,211

[22] PCT Filed: Nov. 16, 1987

[86] PCT No.: PCT/GB87/00823
§ 371 Date: Sep. 19, 1988
§ 102(e) Date: Sep. 19, 1988

[87] PCT Pub. No.: WO88/04118
PCT Pub. Date: Jun. 2, 1988

[30] Foreign Application Priority Data

Nov. 19, 1986 [GB] United Kingdom ................. 8627646
Dec. 2, 1986 [GB] United Kingdom ................. 8628822
Dec. 2, 1986 [GB] United Kingdom ................. 8628823

[51] Int. Cl.$^5$ ........................ H04B 1/10; H04B 17/00
[52] U.S. Cl. ..................................... 455/63; 455/67; 455/185; 455/226
[58] Field of Search ...................... 455/67, 68, 226, 75, 455/88, 62, 71, 185, 186, 166, 161, 63; 370/17, 69.1, 120; 342/421, 57, 22

[56] References Cited

U.S. PATENT DOCUMENTS 4,520,508  5/1985  Reichert, Jr. .......................... 455/67
4,524,446  6/1985  Sun et al. ............................... 455/67

OTHER PUBLICATIONS

1985 IEEE Military Communications Conference, 20-23 Oct. 1985, by D. O. Weddle et al., pp. 146-150.
IEEE Communications Magazine, vol. 24, No. 11, Nov. 1986, pp. 23-29, by K. J. Kokjer et al.
A.F.I.P.S. Proceedings of the National Computer Conference, 19-22, May 1975, by J. Burchfiel et al., pp. 245-251.
IEEE Conference Proceedings, No. 245, 1985, by E. T. Clarke.
Instruction Manual for FT-290R by Yaesu Electronics Corp., Front Page and pp. 21-24.
"Software for Amateur Radio", by Joe Kasser, 1984 TAB Books, Inc., Front Cover, pp. 69-118, 167-172.

Primary Examiner—Reinhard J. Eisenzopf
Assistant Examiner—Curtis Kuntz
Attorney, Agent, or Firm—Fleit, Jacobson, Cohn, Price, Holman & Stern

[57] ABSTRACT

An HF communications system comprising a plurality of radio stations, each radio station including a transceiver and a control means therefor, the control means including a processor and a memory, the memory storing a model of the ionosphere of a designated region in digital form, wherein the order to establish reliable communications channels between the stations, the system undergoes the following procedure: a first station computes from its stored model a propagation frequency window and determines a set of communications channels within the frequency window, the transceiver of the station thereafter monitoring the noise and interference present in the set of channels in order to reject channels having noise and interference levels higher than a predetermined level, and the first station establishing communications with one or more second stations on communication channels of the set in order to actively sound the channels in order to establish which channels are suitable for message transmission. In order to cater for disturbed ionospheric conditions a maximum usable frequency may be determined experimentally in a network setting up procedure or prior to any conversation between two or more stations wherein a series of active sounding test transmissions are carried out on a range of frequency channels between the stations.

15 Claims, 2 Drawing Sheets

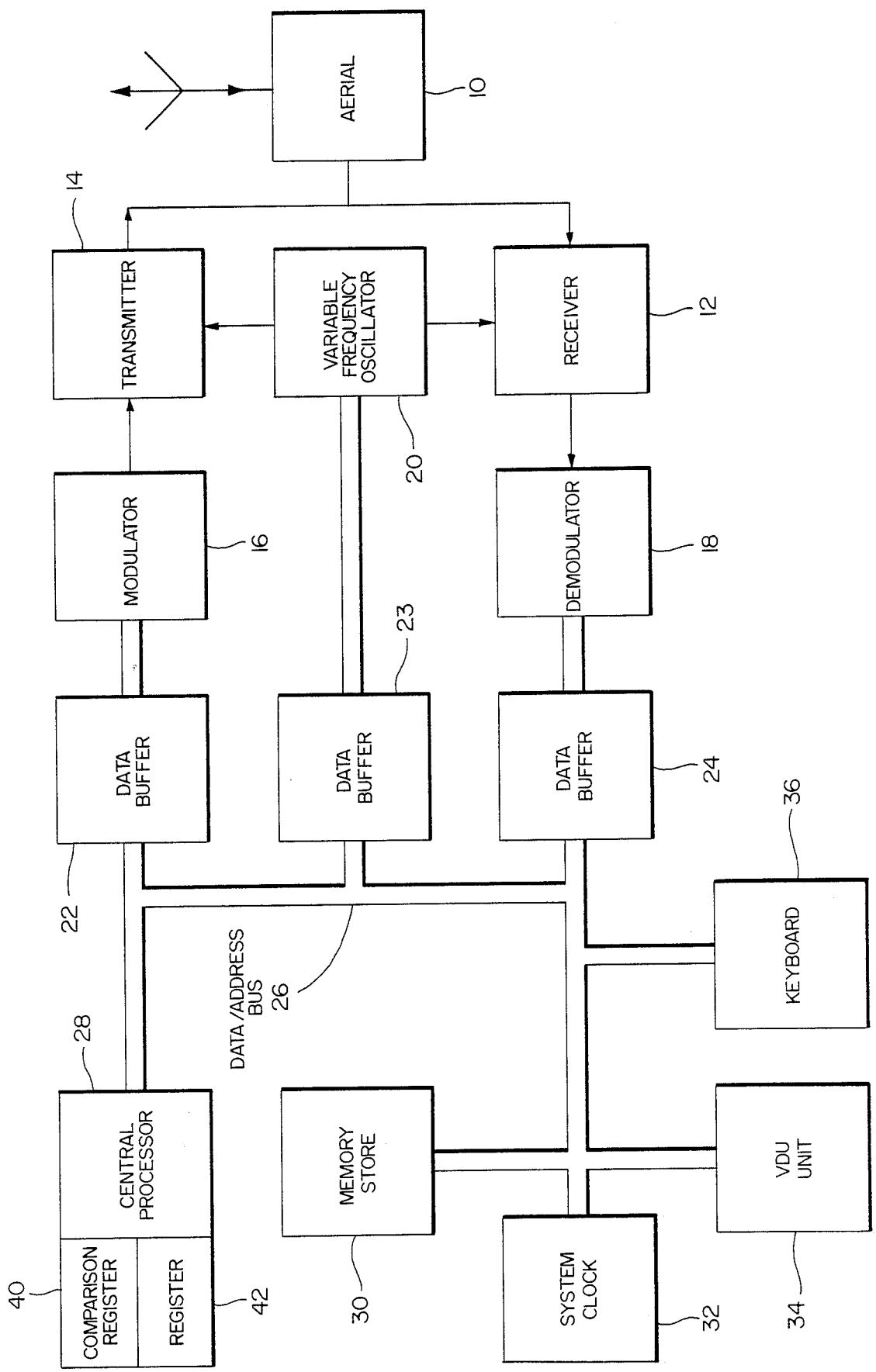

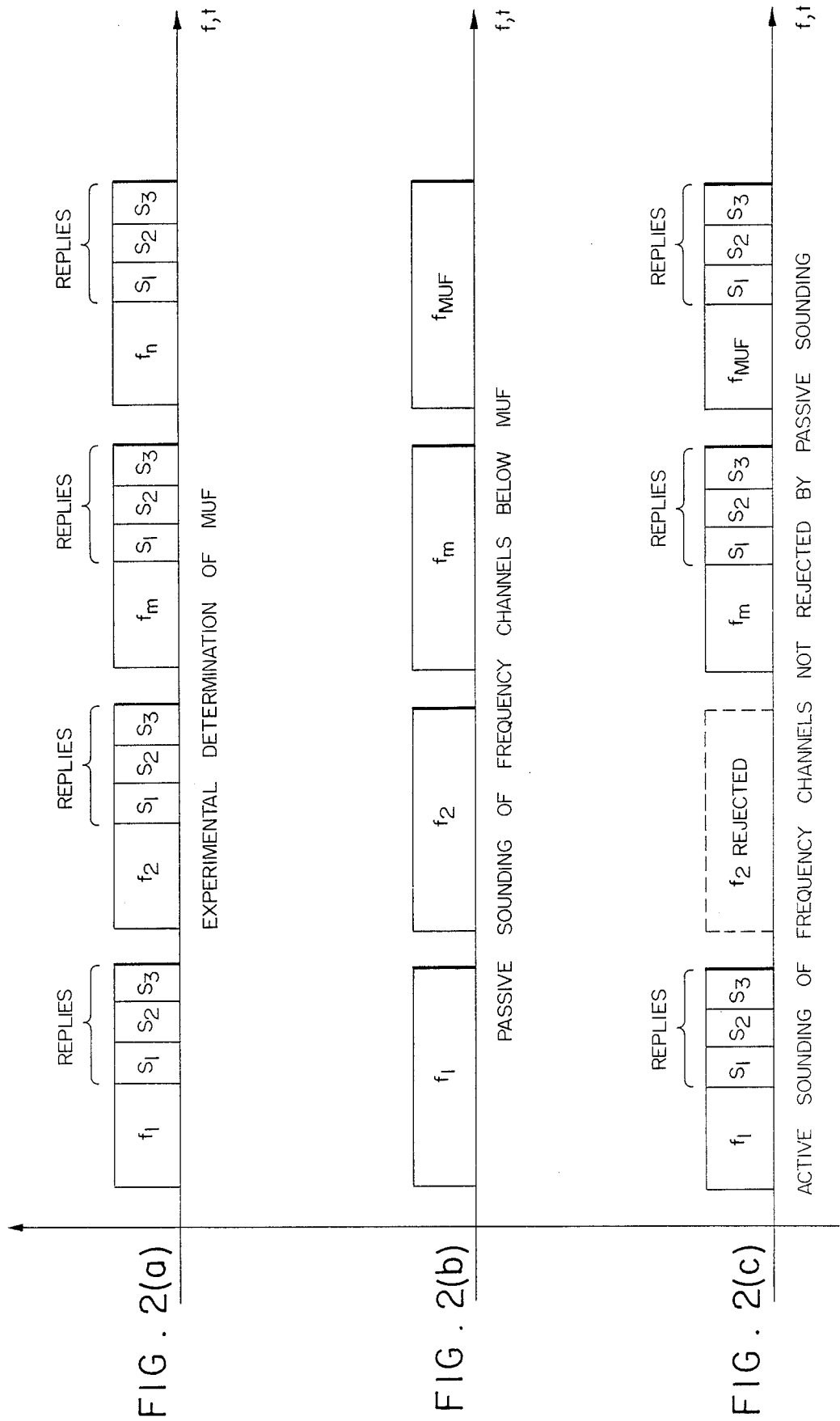

HF RADIO COMMUNICATION SYSTEMS WITH FREQUENCY MANAGEMENT

The present invention relates to improvements of HF radio communications systems and in particular to the establishment of a reliable radio link in the congested HF spectrum when either normal or disturbed propagation conditions exist.

HF is generally recognised as the frequency range 3–30 MHz. However for the purposes of this specification, the term is intended to cover any frequency up to 30 MHz and may include frequencies above 30 MHz. The term is intended to designate that part of the radio frequency spectrum where the wanted signal and/or interfering signals may propogate by reflection from the regular E or F layers of the ionosphere.

HF stations have traditionally required skilled operators in order to establish reliable communication channels. However skilled operators are in short supply and proposals have been made to automate certain call establishment procedures so that unskilled operators may operate the transmission equipment. Thus in IEE Conference Proceedings No. 245, 1985, "Real-time Frequency Management in an Embedded Microcomputer", E. T. Clarke, a microcomputer which is normally present in modern HF transceivers is employed to store a mode of the ionosphere so that predictions of usable channel frequencies may be made automatically.

Nevertheless the need still exists for a fully automatic method of establishing reliable frequency channels, since such prior proposals have all required manual intervention to some degree.

The present invention provides an HF radio communications system comprising a plurality of radio stations, each radio station including a transceiver and a control means therefor, the control means including a processor and a memory, the memory storing a model of the ionosphere of a designated region in digital form, the processor being arranged to compute from the model a propagation frequency window for the required communication channels bewteen the stations, the transceiver being controlled by the control means to assess passively the allocated channels within the frequency window in order to reject those channels which are occupied by high levels of noise or interference, and the system being arranged such that a first station establishes communications with one or more further stations in order to actively sound those allocated channels which have not been rejected in order to establish which channels are suitable for trasmissions.

As preferred, there is an initialisation procedure which takes place within the system between the various radio stations which form part of the system in which one station assumes network control. This procedure is more full described in copending application U.S. Ser. No. 07/220,213 to Goodwin, filed 09/29/88, the contents of which are herein incorporated by reference.

The station which has assumed control is preferably arranged to carry out the procedure referred to above, in which the station computes the propagation window and passively assesses the allocated channels. The network control station then assumes the role of said first station and actively sounds the candidate channels for communication with a selected number of further stations. However it is envisaged that the procedure set fourth above will also be carried out prior to any message transmission in the network wherein the source station assumes the role of the first station and the destination station the role of the further stations.

Thus in order to carry out the procedure set forth above, the first radio station is provided with an HF propagation prediction model which may be used to compute the Maximum Usable Frequency (MUF) and Lowest Usable Frequency (LUF) for skywave propagation and, for example, path loss for both skywave and groundwave propagation. In more advanced implementations, it is envisaged that the model may, for example, also take account of predictions of noise and interference in the data link.

The prediction model is used to compute the frequency window or windows in which suitable channels may be found. For a single address message (SAM), i.e. for communications with only one other radio station, the window(s) are calculated for the single radio link required. For a multi address message (MAM) (i.e. communication between more than two stations) the window(s) are calculated so as to be suitable for all the links required.

However the problem with predicting the MUF by means of a model is that this can only provide a median value. The F2 layer can vary by up to 50% from this median value in undisturbed conditions, thus limiting the usefulness of the model, while in disturbed conditions the model may be useless. As model also has no way of predicting the presence of potentially useful but anomalous propagation modes such as sporadic E.

It is possible to use an ionosonde to provide real-time information on ionospheric conditions but they are expensive, bulky and require skilled personnel to interpret the output.

In a further development of the invention the model employed is adapted to actual conditions by a procedure involving setting up communications between at least two stations of the network, making transmissions between the stations over a plurality of frequency channels spanning a range of frequencies, and carrying out predetermined tests on the results of the transmissons, thereby to determine a maximum usable frequency.

Thus such MUF determined experimentally may modify the value calculated by the ionospheric model and the further procedural steps carried out in order to determine channels of adequate quality will use such modified MUF.

Thus in a further aspect the invention provides an HF communications system comprising a plurality of radio stations, each radio station including a transceiver and a control means therefore, the control means including means for automatically switching the transceiver between a plurality of frequency channels spanning a range of frequecies;

wherein in order to determine the MUF for the system, communication is established between at least two stations and the control means of the stations are arranged automatically to carry out a series of test trasmissions over the frequency channels, and wherein a series of tests are carried out on the results of the transmissions in order to determine a MUF for the prevailing conditions.

The procedures set fourth for the above may be repeated each time a station wishes to communicate with another station. Following the computation of determination and set forth above of the frequency window or windows the channels which fall within the window or windows and which are included in a user's allocation of frequencies are selected. These channels are assessed passively using the radio station receiver. The passive assessment measures the noise and interference levels on each channel and selects a subset of channels which appear sufficiently quiet to support the message transmission.

Active sounding of the quiet channels identified during the passive sounding routine then takes place in order to choose the preferred channel for the required transmission. For example the radio station wishing to transmit a message may contact the destination or destinations using a set of prearranged calling channels which are scanned by all stations in the network. The list of possible channels for the message may be sent to the destination(s) on the calling channels. For a Single Address Message (SAM) the source station may for example, transmit test data sequences on each of the candidate traffic channels in turn and the destination attempts to receive each of the test transmissions and then rank the channel according, for example, to detected error rate and/or signal-to-noise ratio. The destination then replies to the source station on the first choice channel and at the same time nominates reserve channels should the first choice fail. The source station then proceeds with the call on the chosen channel.

For Multi Address Messages (MAM) a similar procedure may be adopted with each destination replying with a ranked list in a predefined timeslot. The source station collates the different repoies received in order to select the preferred channel for the message. In an alternative procedure the source station may transmit test sequences on each of the candidate traffic channels in turn and provide ordered timeslots for acknowledgement from the individual destinations. As soon as an acceptable number of replies are received the call may proceed on that channel without further sounding of the candidate traffic channel which have not been tried.

A preferred embodiment of the invention will now be described with reference to the accompanying drawings, wherein:

FIG. 1 is a block diagram of a first control station according to the invention, of an HF telecommunications system; and FIG. 2(a)-2(c) are diagrams showing how communication channels are determined.

Referring now to FIG. 1 of the drawings, there is shown a station of an HF telecommunications system employing a large number of stations. The station shown has been designated a first or netork control station according to an initialisation procedure which is more fully described in our copending application Ser. No. 220,213.

The station comprises an aerial lo, a receiver 12, a transmitter 14, a modulator 16 coupled to a transmitter 14, and a demodulator 18 coupled to receiver 12, a variable frequency oscillator 20 coupled to modulator 16 and demodulator 18. Information is fed to the modulator and demodulator via data buffers 22, 24 which are coupled to a data/address bus 26 forming part of a microcomputer system which includes a central processor 28 and a memory store 30. Also provided are a system clock 32 and a VDU unit 34 and a keyboard 36 for use by an operator.

The manner of setting up a system of network control is described in our copending application Ser. No. 220,213. Thus when a system of network control has been established, system clocks are synchronised to the clock of the control station and all stations are initialised with control information as to the channels in which data transmission may be effected. Thus when a control station has established control over the network it will compute the possible frequencies for data transmission and will transmit the location of these channels to other stations in the network. The manner in which the frequency channels are computed will now be described.

Each station and in particular the control station includes a map in digital form in memory 30 of the ionosphere in the area of interest. Ionospheric maps in digital form and programs for predicting usable channel frequencies are known in mainframe computers employed in the laboratory (see for example Haydn G. W. et al 1978, "Predicting the Performance of High Frequency Skywave Telecommunications Systems" U.S. Dept. of Commerce, Office of Telecommunications, OT (Report 76–102).) A simplified and less accurate version of such maps and programs is employed in the present invention.

For MUF it uses a subset of the CCIR Report 340, 1983 database selected according to the particular link or area of interest. For LUF it uses a similar subset of the Atmospheric Noise database of CCIR Report 322, 1974, the path-loss processes of CCIR Report 252 (1970, 1978) and a data base of antenna gain. It is fast in operation as its algorithm consists almost entirely of interpolation (mostly linear). It is adaptive to prevailing propagation conditions by means of a number of programmable factors.

The data base is compacted by two methods. Firstly all unnecessary precision is sacrificed so that each unit of data may be held in a single byte of memory. Secondly only sufficient data is held for a particular system deployment (an area of coverage or a number of point-to-point links). The result is that data for a single link or for an area of around 2000 km diameter may be held in around 1 kbytes of memory.

From this model, the control station computes a predicted MUF and LUF for the current time and the next time period of interest. It will be understood that the ionospheric model is adaptive in the sense that should the information be available which shows that the stored map is obsolete, further information may be entered which will enable the ionospheric map to be updated.

Thus the model predicts the MUF in terms of themedian value. The F2-layer can vary by up to 50% from this median value, thus limiting the value of the model, while in disturbed conditions, the model is useless. The model has in addition no way of predicting the presence of potentially useful but anomalous propagation modes such as sporadic E. It is possible to use an ionosonde to provide real-time information on ionospheric conditions but they are expensive, bulky and require skilled personnel to interpret the output.

In accordance with the invention therefore once the model has been employed to predict a MUF and a LUF thereby to determine a frequency window and the frequency channels in the window are determined. In order accurately to determine the MUF, the control station then undertakes a series of active sounding measures in which the control station establishes communication with a selected number of further stations of the network over a control channel of predetermined frequency which is not normally used for data transmission but is reserved for control signals. The control station informs the test stations that data transmission tests will take place. Alternatively the control station during the initialisation procedure initialises all stations and the stations will understand that at a certain interval from initialisation that active sounding will be taking place and they will be ready to provide responses at predetermined times.

Thus, a subset of stations within a network spend some time engaged in active sounding. There must be at least 2 stations involved in this activity but more may be used, a large number of stations tending to produce more accurate results. All stations have stored a number of channels which will be tested in turn. These channels should have a fairly consistent geometric spacing across the HF band.

One of the stations acts as 'control' and the other should be between 100 and 300 km away from it. This prevents normal E-layer or groundwave propagation from affecting the systems. No additional equipment is needed for this activity.

The 'control' station transmits a probe on the first channel and then listens for replies from the other stations in turn, on the same channel. The replies indicate the quality of the signal received. If the received signal was of poor quality then no reply is sent. Also, if no signal is heard from the 'control' then no reply is sent. The first station stores the replies and then move on to the next channel.

When all channels have been sounded the first station determines which channels have propagated. It then identifies which of the propagating channels is most likely to be closest to the MUF by applying a number of test to each channel.

The frequency of the channel identified above is considered to be the vertical incidence F2-layer MUF subject to the constraint below.

The number of tests are then applied to the estimate of MUF which identified if the MUF is likely to be due to sporadic-E. If sporadic-E is considered to be present then the F2-layer MUF cannot be measured at this time.

An example for the case of 60 pre-set channels serves to illustrate the algorithm proposed. The same principle can be applied for any number of channels.

The 60 channels cover the range 1.6 to 30 MHz an average 5% spacing.

The control station determines the propagating channel by noting those on which replies are heard from at least half of the other stations. The control stations then determine which channels are 'potential MUFs'. A channel is considered to be a 'potential MUF' if it has been shown to propogate while the two channels immediately above it did not. If only one channel meets this condition, it is considered to be the MUF subject to the sporadic E test.

The 'control' station calculates the density D of the propagating channel above each potential MUF, except the highest, using the expression:

$$D = \frac{\text{Number of propagating channels above that under test}}{\text{Total number of channels above that under test up to and including the highest progating channel}}$$

All channels for which D > 50% are removed from the list.

If only 1 channel remains it is considered to be the MUF subject to the sporadic E test. If more than 1 remains, the procedure below is followed:

Each potential MUF is given marks if it meets certain criteria. The channel with the most marks is considered to be the MUF. One mark is awarded to a channel for each of the following:

(a) It is within 40% of the model's prediction.

(b) It would be consistent with the expected model trend if it was the MUF.

(c) The scaling factor if that was the MUF is within 10% of the previous value (scaling factor is defined as 'estimated MUF/model MUF').

(d) At least 1 of the 2 channels immediately below it propagated.

(e) The channel immediately below it propagated.

(f) Both channels immediately below it propagated.

(g) Less 3 channels immediately above it did not propagate.

(h) Less than 3 channels in 8 immediately above propagated.

In the event of a tie the channel which gives a scaling factor closest to the previous value is chosen.

An additional set of test is applied to the winning channel in order to determine whether sporadic E propagation is occurring. If any of the 3 tests can be answered 'yes' then sporadic E is deemed to be present.

(a) Is the scalling factor SF (estimated MUF/model MUF) > 1.8?

(b) Was the previous scaling factor (SF1) < 1.3 AND is the new scaling factor SF > 1.5?

(c) Is SF/SF1 > 1.25 AND is SF > 1.2 and is the expected MUF trend flat?

Tests (b) and (c) can only be applied if information from previous sweeps is available.

If sporadic E is indicated, the F2 layer MUF cannot be accurately assessed at this time and the best estimate will be to maintain an unchange scaling factor.

The overall procedure for testing a number of channels is indicated in FIG. 2 in which the control station emits in a series of time slots tests over the range of selected channels and each station within the test subset of stations will understand that these tests are taking place at particular frequencies. Each test station may transmit reply messages within the time slots indicated or alternatively the test procedure may be repeated sequentially for each station of the subset.

Thus once the MUF for prevailing conditions has ben determined experimentally, the propagation window may be defined using a computed LUF and a series of allocated frequency channels may be selected within this window. This selection process is carried out by a simple computation procedure within processor 28. Following the selectin of channels, variable oscillator 20 is arranged to sweep receiver 18 over the selected channel, the receiver is arranged automatically to monitor the amplitude levels of noise and interference present on each channel. These noise levels are compared with a value stored in a comparison register 40 and which defines a lower limit of acceptable noise levels. Thus any allocated channel having a noise level higher than the level in register 40 will be considered not to be suitable for data transmission. Thus a revised list of allocated channel is prepared in which the noise levels present appear adequate.

Following this selection procedure, the processor 28 of the control station is arranged to indicate over a control channel that a further series of test will take place over the allocated data channels between the control channel and a preselected number of stations forming a test subset. The control station and the subset of stations are then automatically reinitialised so that a further test procedure can take place. In this further test procedure, the control station emits a series of sequential time slots data transmission tests over the range of allocated channels and each station within the subset of stations will understand that these tests are taking place at the allocated frequencies. Each station may transmit reply messages within the time slots indicated for each frequency channel, or alternatively the test procedure may be carried out sequentially for each station of the test subset. The amplitude levels or received transmissions are tested in each station against a theshold value set in a register 42 and if the receiver transmissions fall in amplitude below this value set in the register, then the channel is deemed not to be usable for reliable data transmission. In this manner a set of channels is derived in which data transmissions can take place which have relatively low rates in that background noise and interference levels are relatively low.

We claim:

1. A method of establishing reliable communication between a plurality of radio stations in a communications system operating in the high frequency region in which propagation occurs by ionospheric reflection, each radio station including a transceiver and a control means therefor, the control means including a processor and a memory, the memory storing a model of the ionosphere of a designated region in digital form, wherein the method comprises the following steps:

(1) a first station computes from its stored model a propagation frequency window and determines a set of communications channels within the frequency window, (2) the transceiver of the station thereafter monitoring the noise and interference present on the set of channels in order to reject channels having noise and interference levels higher than a predetermined level, (3) and the first station establishing communications with one or more second stations on communications channels of the set in order to actively sound the channels in order to establish which channels are suitable for message transmission.

2. A method according to claim 1, wherein the procedure for channel establishment is carried out in an initial network setting up procedure.

3. A method according to claim 1, wherein the procedure for channel establishment is carried out prior to each message transmission from any station of the network.

4. A method according to claim 3, wherein the message source station contacts one or more message destination stations on a prearranged calling channel to alert the destination station(s) to the active sounding of communication channels.

5. A method according to claim 4, wherein in the case of a single destination station, the destination station produces a ranked list of preferred channels, and replies to the source station on the most preferred channel.

6. A method according to claim 4, wherein in the case of a plurality of destination stations, each destination station replies in a predefined time slot after a test transmission by the source station with a ranked list of preferred channels, the source station collating the replies in order to select the preferred channel.

7. A method according to claim 4 wherein if a source station wishes to communicate with a plurality of destination stations, test transmissions are made on each candidate channel in turn, each destination station providing an acknowledgement within a predefined timeslot and wherein as soon as an acceptable number of replies are received for a particular channel, that channel is selected for message transmission.

8. A method according to claim 1 wherein in addition to computing said frequency window, said first station is arranged to determine by experiment the maximum usable frequency for prevailing conditions by making test transmissions with one or more destination stations, and wherein a series of tests are carried out on the results of the test transmissions.

9. A method according to claim 8, wherein in each test transmission the destination stations transmit reply signals in predefined time slots on the same frequency channels.

10. A method according to claim 9, wherein a series of test transmissions are carried out over a range of channel frequencies, and the replies are stored by the first station.

11. A method according to claim 10, wherein a channel is determined to be propagating channel if replies are received from more than a predetermined proportion of the destination channels.

12. A method according to claim 11, wherein the first station determines which channels are potential maximum usable frequencies (MUF) if the two channels immediately above in the frequency spectrum did not propogate.

13. A method according to claim 12, wherein the density of propagating channels D above each potential MUF is calculated as follows:

$$D = \frac{\text{number of propagating channels above that under test}}{\text{total number of channels above that under test up to and including the highest propagating channel}},$$

and all channels for which D is above a predetermined value are rejected.

14. A method according to claim 13 wherein each remaining potential MUF is given marks if it meets certain criteria as follows:

it is consistent with a computer MUF value;
channels immediately below the frequency spectrum propagated;
channels immediately above in the frequency spectrum did not propagate.

15. A method according to claim 14, wherein tests are carried out on the winning MUF to determine whether sporadic E is present.

* * * * *